(12) United States Patent
Sirotkin et al.

(10) Patent No.: US 9,807,591 B2
(45) Date of Patent: Oct. 31, 2017

(54) ESTABLISHMENT OF CONNECTION TO THE INTERNET IN CELLULAR NETWORK

(71) Applicant: INTEL IP CORPORATION, Santa Clara, CA (US)

(72) Inventors: Alexander Sirotkin, Giv'on Hachadasha (IL); Alexandre S. Stojanovski, Paris (FR)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/770,880

(22) PCT Filed: Dec. 26, 2013

(86) PCT No.: PCT/US2013/077793
§ 371 (c)(1),
(2) Date: Aug. 27, 2015

(87) PCT Pub. No.: WO2014/158275
PCT Pub. Date: Oct. 2, 2014

(65) Prior Publication Data
US 2016/0007346 A1   Jan. 7, 2016

Related U.S. Application Data

(60) Provisional application No. 61/806,821, filed on Mar. 29, 2013.

(51) Int. Cl.
*H04W 72/04* (2009.01)
*H04W 76/02* (2009.01)
(Continued)

(52) U.S. Cl.
CPC .............. *H04W 8/082* (2013.01); *H04B 1/56* (2013.01); *H04B 7/0417* (2013.01);
(Continued)

(58) Field of Classification Search
CPC ............. H04W 8/082; H04W 36/0022; H04W 36/0011; H04W 48/06; H04W 8/02;
(Continued)

(56) References Cited

U.S. PATENT DOCUMENTS

2011/0103310 A1   5/2011 Stojanovski et al.
2012/0250513 A1*  10/2012 De Benedittis ....... H04W 28/18
                                                        370/236

(Continued)

FOREIGN PATENT DOCUMENTS

WO    2012128355    9/2012
WO    2012177023    12/2012

OTHER PUBLICATIONS

ETSI TS 136 413 V11.2.1 (Feb. 2013); Technical Specification, LTE; Evolved Universal Terrestrial Radio Access Network (E-UTRAN); S1 Application Protocol (S1AP) (3GPP TS 36.413 version 11.2.1 Release 11), 277 pages.

(Continued)

*Primary Examiner* — Omar Ghowrwal
(74) *Attorney, Agent, or Firm* — Schwabe, Williamson & Wyatt, P.C.

(57) ABSTRACT

Some demonstrative embodiments include devices, systems and/or methods to establish a connection to the Internet via a local gateway (L-GW) function for a LIPA or a SIPTO@LN. The establishment of the connection to the Internet may be performed, for example, by at least one of an E-RAB SETUP procedure, an INITIAL CONTEXT SETUP procedure, an INITIAL UE MESSAGE procedure or an UPLINK NAS TRANSPORT procedure.

4 Claims, 4 Drawing Sheets

(51) Int. Cl.
| | |
|---|---|
| H04W 28/20 | (2009.01) |
| H04W 8/08 | (2009.01) |
| H04L 5/00 | (2006.01) |
| H04B 1/56 | (2006.01) |
| H04B 7/06 | (2006.01) |
| H04W 48/16 | (2009.01) |
| H04W 36/30 | (2009.01) |
| H04W 24/00 | (2009.01) |
| H04W 36/26 | (2009.01) |
| H04W 48/18 | (2009.01) |
| H04B 7/0417 | (2017.01) |
| H04W 36/00 | (2009.01) |
| H04W 36/22 | (2009.01) |
| H04L 1/18 | (2006.01) |
| H04W 24/02 | (2009.01) |
| H04W 72/08 | (2009.01) |
| H04L 29/06 | (2006.01) |
| H04M 1/725 | (2006.01) |
| H04W 4/02 | (2009.01) |
| H04W 8/02 | (2009.01) |
| H04W 8/06 | (2009.01) |
| H04W 28/02 | (2009.01) |
| H04W 48/06 | (2009.01) |
| H04L 25/03 | (2006.01) |
| H04N 21/24 | (2011.01) |
| H04N 21/845 | (2011.01) |
| H04N 21/8543 | (2011.01) |
| H04B 7/0452 | (2017.01) |
| H04B 7/08 | (2006.01) |
| H04L 25/02 | (2006.01) |
| H04W 36/08 | (2009.01) |
| H04W 48/12 | (2009.01) |
| H04W 88/08 | (2009.01) |
| H04W 84/04 | (2009.01) |
| H04W 88/10 | (2009.01) |
| H04W 84/12 | (2009.01) |
| H04W 88/02 | (2009.01) |
| H04W 28/08 | (2009.01) |

(52) U.S. Cl.
CPC ........... *H04B 7/0452* (2013.01); *H04B 7/063* (2013.01); *H04B 7/0619* (2013.01); *H04B 7/0695* (2013.01); *H04B 7/088* (2013.01); *H04L 1/1864* (2013.01); *H04L 5/0048* (2013.01); *H04L 5/0051* (2013.01); *H04L 5/0057* (2013.01); *H04L 5/0085* (2013.01); *H04L 25/0206* (2013.01); *H04L 25/03305* (2013.01); *H04L 65/4092* (2013.01); *H04L 65/601* (2013.01); *H04L 65/602* (2013.01); *H04L 65/604* (2013.01); *H04L 65/607* (2013.01); *H04L 65/608* (2013.01); *H04L 65/80* (2013.01); *H04M 1/72572* (2013.01); *H04N 21/2402* (2013.01); *H04N 21/8456* (2013.01); *H04N 21/8543* (2013.01); *H04W 4/021* (2013.01); *H04W 8/02* (2013.01); *H04W 8/06* (2013.01); *H04W 24/00* (2013.01); *H04W 24/02* (2013.01); *H04W 28/0226* (2013.01); *H04W 28/0289* (2013.01); *H04W 28/20* (2013.01); *H04W 36/0005* (2013.01); *H04W 36/0011* (2013.01); *H04W 36/0022* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 72/0446* (2013.01); *H04W 72/082* (2013.01); *H04W 76/025* (2013.01); *H04L 5/0007* (2013.01); *H04L 2025/03426* (2013.01); *H04W 28/085* (2013.01); *H04W 36/08* (2013.01); *H04W 48/12* (2013.01); *H04W 72/046* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(58) Field of Classification Search
CPC ........... H04W 76/025; H04W 28/0289; H04W 4/021; H04W 28/0226; H04W 8/06; H04W 28/20; H04W 72/0446; H04W 72/082; H04W 36/22; H04W 36/0005; H04W 36/26; H04W 48/18; H04W 24/00; H04W 36/30; H04W 48/16; H04W 72/046; H04W 28/085; H04W 84/042; H04W 88/02; H04W 84/12; H04W 88/10; H04W 84/045; H04W 88/08; H04W 48/12; H04W 36/08; H04B 7/0619; H04B 7/0695; H04B 7/063; H04B 7/088; H04B 7/0452; H04B 7/0417; H04B 1/56; H04L 25/0206; H04L 65/607; H04L 65/604; H04L 65/602; H04L 25/03305; H04L 65/4092; H04L 65/80; H04L 65/608; H04L 65/601; H04L 1/1864; H04L 5/0048; H04L 5/0057; H04L 5/0051; H04L 5/0085; H04L 2025/03426; H04L 5/007; H04N 21/8456; H04N 21/8543; H04N 21/2402; H04M 1/72572; Y02B 60/50

See application file for complete search history.

(56) References Cited

U.S. PATENT DOCUMENTS

| | | | |
|---|---|---|---|
| 2012/0300750 A1 | 11/2012 | Chin et al. | |
| 2013/0058312 A1* | 3/2013 | Zhou | ............... H04W 8/12 370/331 |
| 2013/0077575 A1 | 3/2013 | Vadlamudi | |
| 2013/0107863 A1* | 5/2013 | Faccin | ............. H04W 36/0022 370/331 |

OTHER PUBLICATIONS

ETSI TS 136 401 V11.1.0 (Jan. 2013); Technical Specification, LTE; Evolved Universal Terrestrial Radio Access Network (E-UTRAN); Architecture description; (3GPP TS 36.401 version 11.1.0 Release 11), 22 pages.

ETSI TS 123 401 V115.0 (Apr. 2013); Technical Specification, LTE; General Packet Radio Service (GPRS) enhancements for Evolved Universal Terrestrial Radio Access Network (E-UTRAN) access; (3GPP TS 23.401 version 11.5.0 Release 11), 288 pages.

ETSI TS 136 423 V11.4.0 (Apr. 2013); Technical Specification, LTE; Evolved Universal Terrestrial Radio Access Network (E-UTRAN); X2 Application Protocol (X2AP) (3GPP TS 36.423 version 11.4.0 Release 11), 145 pages.

International Search Report and Written Opinion of PCT/US2013/077793, dated Apr. 28, 2014, 11 pages.

International Preliminary Report on Patentability of PCT/US2013/077793, dated Mar. 9, 2015, 24 pages.

3GPP TR 23.859 V12.0.1 (Apr. 2013), Technical Report, 3rd Generation Partnership Project; Technical Specification Group Services and System Aspects; Local IP access (LIPA) mobility and Selected IP Traffic Offload (SIPTO) at the local network (Release 12), 68 pages.

Extended European Search Report dated Nov. 7, 2016, European Patent Application No. 13880646.8, 10 pages.

(56) References Cited

OTHER PUBLICATIONS

LG Electronics Inc., "RAN3 impacts for SIPTP at the Local Network," 3GPP TSG-RAN WG3 Meeting #79bis, R3-130693, Agenda item: 17, Apr. 15-19, 2013, Chicago, USA, 4 pages.

Intel et al., "Introduction of SIPTO at the Local Network with collocated Local Gateway function," 3GPP TSG-SA2 Meeting #95, S2-130555, (revision of S2-130291), Current version: 11.4.0, Jan. 28-Feb. 1, 2013, Prague, Czech Republic, 28 pages.

Alcatel-Lucent, "Correction of Radio Capabilities," 3GPP RSG-RAN3 Meeting #79, R3-130166, Current version: 11.2.0, Jan. 28-Feb. 1, 2013, Malta, 6 pages.

3GPP, "Local IP access (LIPA) mobility and Selected IP Traffic Overload (SIPTO) at the local network (Release 12)," 3GPP TR 23.859 V12.0.0 (Mar. 2013), Lte Advanced, 68 pages.

3GPP, "Evolved Universal Terrestrial Radio Access Network (E-UTRAN); S1 Application Protocol (S1AP) (Release 11)," 3GPP TS 36.413 V11.3.0 (Mar. 2013); Lte Advanced, 274 pages.

3GPP, "General Packet Radio Service (GPRS) enhancements for Evolved Universal Terrestrial Radio Access Network (E-UTRAN) access (Release 12)," 3GPP TS 23.401 V12.0.0 (Mar. 2013), Mar. 7, 2013, Lte Advanced, 290 pages.

3GPP, "3GPP System Architecture Evolution (SAE); Security architecture (Release 12)," 3GPP TS 33.401 V12.7.0 (Mar. 2013), Mar. 15, 2013, Lte Advanced, 121 pages.

3GPP, "Evolved Universal Terrestrial Radio Access Network (E-UTRAN); Architecture description (Release 11)," 3GPP TS 36.401 V11.1.0 (Dec. 2012), Dec. 19, 2012, Lte Advanced, 20 pages.

3GPP, "Evolved Universal Terrestrial Radio Access Network (E-UTRAN); S1 Application Protocol (S1AP) (Release 11)," 3GPP TS 36.413 V11.3.0 (Mar. 2013), Mar. 18, 2013, Lte Advanced, 274 pages.

Office Action dated Feb. 14, 2017 from Japanese Patent Application No. 2015-560175, 5 pages.

ZTE, "Indicating bearer type to the H(e)NB when the LIPA or SIPTO©LN function is activated," SA WG2 Meeting #95, S2-130232, Change Request, 23.401, CR, CRNum, rev, Current version: b.4.0, Jan. 28-Feb. 1, 2013, Prague, Czech Republic, 21 pages.

Office Action dated Apr. 18, 2017 from Korean Divisional Application No. 10-2017-7006236, 12 pages.

3GPP, "Technical Specification Group Services and System Aspects; Local IP Access and Selected IP Traffic Offload (LIPA-SIPTO) (Release 10)," 3GPP TR 23.829 V10.0.1 (Oct. 2011), Lte Advanced, 43 pages.

\* cited by examiner

ESTABLISHMENT OF CONNECTION TO THE INTERNET IN CELLULAR NETWORK

CROSS REFERENCE

This application claims the benefit of and priority from U.S. Provisional Patent Application No. 61/806,821 entitled "Advanced Wireless Communication Systems and Techniques", filed Mar. 29, 2013, the entire disclosure of which is incorporated herein by reference.

BACKGROUND

In recent years, Internet usage and data services using the Internet from Smartphones have dramatically increased and with that, traffic from the Smartphones increased. This abrupt increase in the traffic has reduced the available bandwidth of mobile operator network. Traffic offloading is a technology to veer traffic from U-plane directly to the Internet from long term evolution (LTE) base stations (e.g., an evolved NodeB (eNB)). There are at least two traffic offload technologies: local IP access (LIPA) and selected IP traffic offload (SIPTO).

LIPA is used in LTE 3GPP Rel-10 as a function allowing the User Equipment (UE) connected via a Home eNodeB (HeNB) to access other IP capable entities in the same residential/enterprise IP network without the user plane traversing the mobile operator's core network. The LIPA function is realized by collocating a Local Gateway (L-GW) function, which is a subset of the PDN Gateway function, with the HeNB. The user plane traffic is forwarded directly between the HeNB and its collocated L-GW function, without traversing the core network. The LIPA function is specified in 3GPP TS 23.401.

SIPTO is used in a 3GPP Rel-10 as a function allowing an operator to offload certain types of traffic at a network node residing close to user equipment's (UE's) current location. SIPTO is offloaded at a PDN Gateway function that resides in the mobile operator's core network.

Thus, there is a need to resolve the problem of available bandwidth in LTE networks by using traffic offload technology.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
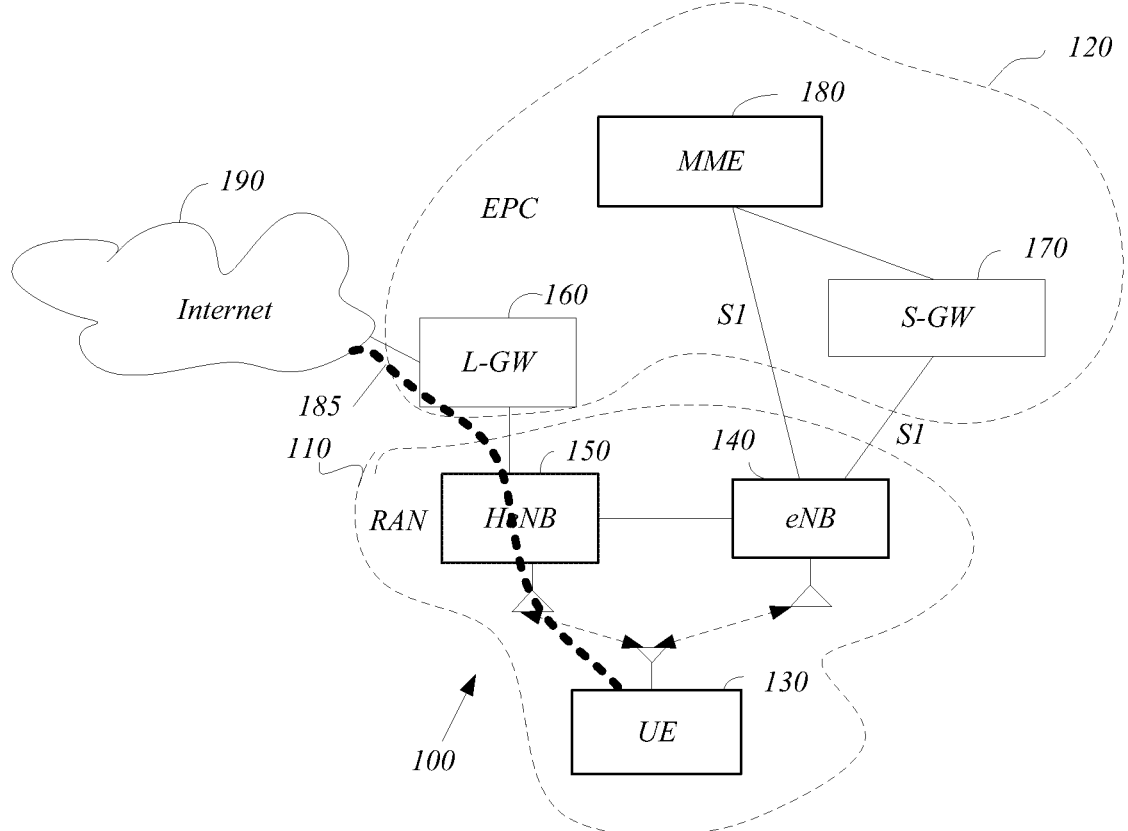
FIG. 1 is a schematic block diagram illustration of a cellular system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications, e.g., 3GPP TS 36.413: $3^{rd}$ Generation Partnership Project; Technical Specification 3rd Generation Partnership Project; Technical Specification Group Radio Access Network; Evolved Universal Terrestrial Radio Access Network (E-UTRAN); S1 Application Protocol (S1AP) (Release 11) on Group Radio Access Network; Evolved Universal Terrestrial Radio Access Network (E-UTRAN); S1 Application Protocol (S1AP), 3GPP TS 36.401: 3rd Generation Partnership Project; Technical Specification Group Radio Access Network; Evolved Universal Terrestrial Radio Access Network (E-UTRAN); Architecture description, and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth.®., Global Positioning System (GPS), Wireless Local Area Network (for example, Wireless Fidelity (WI-FI)), Wireless Metropolitan Area Network (for example, WI-MAX), ZigBee.™., Ultra-Wideband (UWB), Global System for Mobile communication (GSM), second generation (2G), 2.5G, 3G, 3.5G, 4G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1.times. RTT), Evolution-Data Optimized (EV-DO), Enhanced Data rates for GSM Evolution (EDGE), and the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node ("also referred to as a "base station"), or the like. The linking between a carrier frequency of the downlink resources and a carrier frequency of the uplink resources may be indicated in system information transmitted on the downlink resources.

The term S1, as used herein, may identify a logical interface between an eNB and an Evolved Packet Core (EPC), providing an interconnection point between the Evolved Universal Terrestrial Radio Access Network (E-UTRAN) and the EPC. It is also considered as a reference point.

The term E-UTRAN Radio Access Bearer (E-RAB), as used herein, may identify a concatenation of an S1 Bearer and the corresponding Data Radio Bearer. When an E-RAB exists, there is a one-to-one mapping between this E-RAB and an EPS bearer of the Non Access Stratum (NAS).

The term X2, as used herein, may identify a logical interface between two eNBs. Whilst logically representing a point-to-point link between eNBs, the physical realization need not be a point-to-point link.

Reference is now made to FIG. 1, which schematically illustrates a block diagram of a cellular system 100, in accordance with some demonstrative embodiments. For example, cellular system 100 may include a 4th generation cellular system such as, for example, a WiMAX cellular system, a long term evolution (LTE) or LTE advance cellular system for example, LTE advance nay include releases 10, 11, 12 or above.

In some demonstrative embodiments, cellular system 100 may be 4th, 5th, 6th generation or higher generation cellular system. For example, cellular system 100 may include LTE, LTE advance, WiMAX or the like. According to one embodiment, cellular system 100 may include a radio access network (RAN) 110 and an EPC 120, if desired. For example, RAN 110 may include a user equipment (UE) 130, a base station 140 e.g., an eNB, and a base station 150 e.g., a Home eNB (HeNB), if desired. EPC 120 may include a Local Gateway (L-GW) 160, a Serving Gateway (S-GW) 170 and a Mobility Management Entity (MME) 180.

In some demonstrative embodiments, for example, UE 130 may send a request to HeNB 150 and/or to eNB 140 to be connected to Internet 190. eNB 140 may send to MME 180 messages via S1 application protocol (S1AP) procedures. The message may include a request to establish the connection to the Internet 190 or to the local network. For example, MME 180 may establish connection to a local network via a L-GW function for a local IP access (LIPA), and to Internet 190 via a Selected IP traffic offload at a local network (SIPTO@LN), if desired.

According to one exemplary embodiment, after the establishment of the connection to the Internet 190, UE 130 may be connected to Internet 190 via HeNB 150 and/or eNB 140 and L-GW 160 as indicted by dotted line 185.

In some demonstrative embodiments, UE 130 may include, for example, a mobile computer, a laptop computer, a notebook computer, an Ultrabook™ computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

According to some exemplary embodiments, MME 180 may be configured to establish a connection to the Internet 190 via a L-GW function for a LIPA or a SIPTO@LN. For example, MME 180 may be connected to eNB 140 via a S1 logical interface, if desired. The S1 logical interface may include SLAP procedures, and MME 180 may establish the connection to Internet 190 by at least one of an E-RAB SETUP procedure, and an INITIAL CONTEXT SETUP procedure, although it should be understood that embodiments are not limited the above-described SLAP procedures.

According to some exemplary embodiments, the SIPTO function may allow for traffic offload even closer to the network edge. A node at which the offload is performed with SIPTO@LN is referred to as Local Gateway (L-GW), which is for example, a subset of the PDN Gateway function. The L-GW resides in the "local network", the latter vaguely referring to an IP network that is accessible at the RAN level.

According to some embodiments, the SIPTO@LN may be implemented with a stand-alone L-GW, and/or with collocated L-GW. For example, L-GW function may be collocated with the HeNB, and the SIPTO@LN function may be invoked by the operator wishing to offload low-value traffic (e.g. Internet traffic), without notifying the user explicitly, although the scope of some embodiments is not limited to this example.

Figure 2:
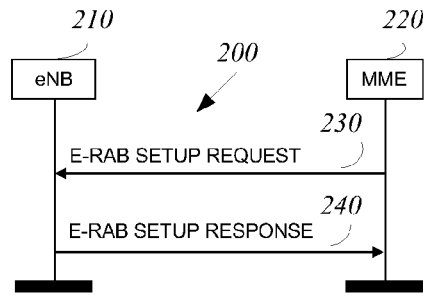
FIG. 2 is a schematic flow-chart illustration of an Evolved Universal Terrestrial Radio Access Network (E-UTRAN) Radio Access Bearer (E-RAB) setup procedure, in accordance with some demonstrative embodiments.

Reference is now made to FIG. 2, a schematic flow-chart illustration of an E-RAB setup procedure 200, in accordance with some demonstrative embodiments. According to some embodiments, the E-RAB setup procedure 200 may be configured, for example, in accordance with 3GPP technical specification (TS) TS 36.413: 3$^{rd}$ Generation Partnership Project; Technical Specification Group Radio Access Network; Evolved Universal Terrestrial Radio Access Network (E-UTRAN); S1 Application Protocol (S1AP). The E-RAB Setup procedure 200 may be configured to assign resources on Uu and S1 for one or several E-RABs and to setup corresponding Data Radio Bearers for a given UE. The E-RAB Setup procedure may use UE-associated signaling.

According to some exemplary embodiments, an MME 220 may initiate the procedure by sending an E-RAB SETUP REQUEST message to an eNB 210. For example, an E-RAB SETUP REQUEST 230 message may include the information required by eNB 210 to build the E-RAB configuration including at least one E-RAB, and for each E-RAB to include an E-RAB to be Setup Item information element (IE).

Upon reception of the E-RAB SETUP REQUEST message 230, and if resources are available for the requested configuration, eNB 210 may execute the requested E-RAB configuration. For each E-RAB and based on the E-RAB level quality of service (QoS) parameters IE, eNB 210 may establish a Data Radio Bearer, and allocate the required resources on Uu. eNB 210 may pass the NAS-PDU IE and the value contained in the E-RAB ID IE received for the E-RAB for each established Data Radio Bearer to the UE. The eNB 210 may not send the NAS PDUs associated to failed Data radio bearers to the UE. The eNB 210 may allocate the required resources on Si for the E-RABs requested to be established.

According to some embodiments, MME 220 may send to eNB 210 an E-RAB setup request message 230, which may include a correlation ID information element (IE), wherein eNB 210 may be configured with L-GW function for LIPA operation or SIPTO@LN operation, and configured to use the information included in the correlation ID for LIPA operation or SIPTO@LN operation for a concerned E-RAB. For example, the correlation ID IE may inform eNB 210 which bearers may be routed to the L-GW. The correlation ID IE may identify the L-GW, if desired. eNB 210 may send an E-RAB SETUP RESPONSE message 240, which may include a result for an at least one requested E-RAB, although the scope of some embodiments is not limited in this respect.

According to embodiments, Table 1 below describes an exemplary content of E-RAB SETUP REQUEST message 230, if desired:

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |

TABLE 1-continued

| | | | | | |
|---|---|---|---|---|---|
| >E-RAB To Be Setup Item IEs | | 1 ... <maxno of E-RABs> | | EACH | reject |
| >>E-RAB ID | M | 9.2.1.2 | | — | |
| >>E-RAB Level QoS Parameters | M | 9.2.1.15 | Includes necessary QoS parameters. | — | |
| >>Transport Layer Address | M | 9.2.2.1 | | — | |
| >>GTP-TEID | M | 9.2.2.2 | EPC TEID. | — | |
| >>NAS-PDU | M | 9.2.3.5 | | — | |
| >>Correlation ID | O | 9.2.1.80 | | YES | ignore |
| >>LIPA-SIPTO Flag | O | 9.2.1.90 | | YES | ignore |

| Range bound | Explanation |
|---|---|
| maxnoofE-RABs | Maximum no. of E-RAB allowed towards one UE, the maximum value is 256. |

For example, the LIPA-SIPTO Flag of the E-RAB setup request function may configure the eNB to establish the connection to the Internet via the L-GW function for LIPA or SIPTO@LN.

Figure 3:
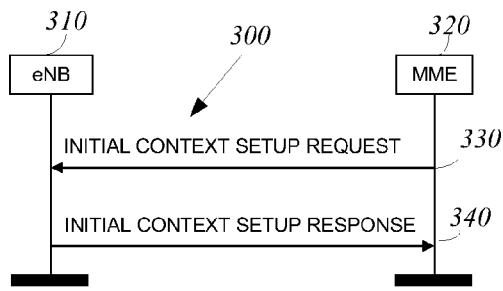
FIG. 3 is a schematic flow-chart illustration of an initial context setup procedure, in accordance with some demonstrative embodiments.

According to some embodiments, an E-RAB SETUP REQUEST function may include, for example the following:

Reference is now made to FIG. 3 which is a schematic flow-chart illustration of an INITIAL CONTEXT SETUP procedure 300, in accordance with some demonstrative embodiments. According to some embodiments, the INITIAL CONTEXT SETUP procedure 300 may be configured to establish the necessary overall initial UE Context including E-RAB context, a Security Key, a Handover Restriction

```
-- **************************************************************
--
-- E-RAB Setup Request
--
-- **************************************************************
E-RABSetupRequest ::= SEQUENCE {
    protocolIEs    ProtocolIE-Container         { {E-RABSetupRequestIEs} },
    ...
}
E-RAB SetupRequestIEs S1AP-PROTOCOL-IES ::= {
    { ID id-MME-UE-S1AP-ID                      CRITICALITY reject    TYPE MME-UE-S1AP-ID
        PRESENCE mandatory}|
    { ID id-eNB-UE-S1AP-ID                      CRITICALITY reject    TYPE ENB-UE-S1AP-ID
        PRESENCE mandatory}|
{ ID id-uEaggregateMaximumBitrate               CRITICALITY reject    TYPE UEAggregateMaximumBitrate
PRESENCE optional }|
    { ID id-E-RABToBeSetupListBearerSUReq       CRITICALITY reject    TYPE E-
RABToBeSetupListBearerSUReq                     PRESENCE mandatory},
    ...
}
E-RABToBeSetupListBearerSUReq ::= SEQUENCE (SIZE(1.. maxnoofE-RABs)) OF ProtocolIE-SingleContainer
{ {E-RABToBeSetupItemBearerSUReqIEs} }
E-RABToBeSetupItemBearerSUReqIEs                S1AP-PROTOCOL-IES ::= {
    { ID id-E-RABToBeSetupItemBearerSUReq       CRITICALITY reject    TYPE E-
RABToBeSetupItemBearerSUReq                     PRESENCE mandatory },
    ...
}
E-RABToBeSetupItemBearerSUReq ::= SEQUENCE {
    e-RAB-ID                                    E-RAB-ID,
    e-RABlevelQoSParameters                     E-RABLevelQoSParameters,
    transportLayerAddress                       TransportLayerAddress,
    gTP-TEID                                    GTP-TEID,
    nAS-PDU                                     NAS-PDU,
    iE-Extensions                               ProtocolExtensionContainer { {E-RABToBeSetupItemBearerSUReqExtIEs} }
} OPTIONAL,
    ...
}
E-RABToBeSetupItemBearerSUReqExtIEs S1AP-PROTOCOL-EXTENSION ::= {
    { ID id-Correlation-ID                      CRITICALITY ignore   EXTENSION Correlation-ID        PRESENCE
optional},
{ ID id-LIPA-SIPTO-Flag                         CRITICALITY ignore EXTENTION LIPA-SIPTO-Flag         PRESENCE
optional},
    ...
}
```

List, an UE Radio capability, an UE Security Capabilities, and the like. The INITIAL CONTEXT SETUP procedure 300 may use E-associated signaling, if desired.

For example, an MME 320 may send to an eNB 310, which is configured with L-GW function for LIPA operation or SIPTO@LN operation and further configured to use information included in the correlation ID for LIPA operation or SIPTO@LN operation for a concerned E-RAB, an INITIAL CONTEXT SETUP REQUEST message 330, which may include an "E-RAB to be Setup Item" IE that includes the correlation ID IE. For example, the correlation ID IE may inform the eNB which bearers should be routed to L-GW. In addition, the correlation ID IE may identify the L-GW. MME 320 may receive an INITIAL CONTEXT SETUP RESPONSE message 340 from eNB 310.

According to some embodiments, Table 2 below describes an exemplary content of the INITIAL CONTEXT REQUEST message, if desired:

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 ... <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.1.80 | | YES | ignore |
| >>LIPA-SIPTO Flag | O | | 9.2.1.90 | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15]. | YES | Reject |
| Trace Activation | O | | 9.2.1.4 | | YES | Ignore |
| Handover Restriction List | O | | 9.2.1.22 | | YES | Ignore |
| UE Radio Capability | O | | 9.2.1.27 | | YES | Ignore |
| Subscriber Profile ID for RAT/Frequency priority | O | | 9.2.1.39 | | YES | Ignore |
| CS Fallback Indicator | O | | 9.2.3.21 | | YES | Reject |
| SRVCC Operation Possible | O | | 9.2.1.58 | | YES | Ignore |
| CSG Membership Status | O | | 9.2.1.73 | | YES | Ignore |
| Registered LAI | O | | 9.2.3.1 | | YES | Ignore |
| GUMMEI | O | | 9.2.3.9 | This IE indicates the MME serving the UE. | YES | Ignore |
| MME UE S1AP ID 2 | O | | 9.2.3.3 | This IE indicates the MME UE S1AP ID assigned by the MME. | YES | Ignore |
| Management Based MDT Allowed | O | | 9.2.1.83 | | YES | Ignore |
| Management Based MDT PLMN List | O | | MDT PLMN List 9.2.1.89 | | YES | Ignore |

For example, the LIPA-SIPTO Flag of the E-RAB setup request function may configure the eNB to establish the connection to the Internet via the L-GW function for LIPA or SIPTO@LN.

According to some embodiments, the INITIAL CONTEXT SETUP REQUEST function may include, for example, the following:

```
-- ******************************************************************
--
-- Initial Context Setup Request
--
-- ******************************************************************
InitialContextSetupRequest ::= SEQUENCE {
    protocolIEs                 ProtocolIE-Container    { {InitialContextSetupRequestIEs} },
    ...
}
InitialContextSetupRequestIEs S1AP-PROTOCOL-IES ::= {
    { ID id-MME-UE-S1AP-ID                      CRITICALITY reject          TYPE MME-UE-S1AP-ID
    PRESENCE mandatory}|
    { ID id-eNB-UE-S1AP-ID                      CRITICALITY reject          TYPE ENB-UE-S1AP-ID
    PRESENCE mandatory}|
    { ID id-uEaggregateMaximumBitrate           CRITICALITY reject          TYPE UEAggregateMaximumBitrate
    PRESENCE mandatory}|
    { ID id-E-RABToBeSetupListCtxtSUReq         CRITICALITY reject          TYPE E-RABToBeSetupListCtxtSUReq
    PRESENCE mandatory}|
    { ID id-UESecurityCapabilities              CRITICALITY reject          TYPE UESecurityCapabilities
    PRESENCE mandatory}|
    { ID id-SecurityKey                         CRITICALITY reject          TYPE SecurityKey
    PRESENCE mandatory}|
    { ID id-TraceActivation                     CRITICALITY ignore          TYPE TraceActivation
    PRESENCE optional}|
    { ID id-HandoverRestrictionList             CRITICALITY ignore          TYPE HandoverRestrictionList
    PRESENCE optional}|
    { ID id-UERadioCapability                   CRITICALITY ignore          TYPE UERadioCapability
    PRESENCE optional}|
    { ID id-SubscriberProfileIDforRFP           CRITICALITY ignore          TYPE SubscriberProfileIDforRFP
    PRESENCE optional}|
    { ID id-CSFallbackIndicator                 CRITICALITY reject          TYPE CSFallbackIndicator
    PRESENCE optional}|
    { ID id-SRVCCOperationPossible              CRITICALITY ignore          TYPE SRVCCOperationPossible
    PRESENCE optional}|
    { ID id-CSGMembershipStatus                 CRITICALITY ignore          TYPE CSGMembershipStatus
    PRESENCE optional}|
    { ID id-RegisteredLAI                       CRITICALITY ignore          TYPE LAI
    PRESENCE optional}|
    { ID id-GUMMEI-ID                           CRITICALITY ignore          TYPE GUMMEI
    PRESENCE optional}|
    { ID id-MME-UE-S1AP-ID-2                    CRITICALITY ignore          TYPE MME-UE-S1AP-ID
    PRESENCE optional}|
    { ID id-ManagementBasedMDTAllowed           CRITICALITY ignore          TYPE ManagementBasedMDTAllowed
    PRESENCE optional}|
    { ID id-ManagementBasedMDTPLMNList              CRITICALITY ignore          TYPE MDTPLMNList
    PRESENCE optional},
    ...
}
E-RABToBeSetupListCtxtSUReq ::= SEQUENCE (SIZE(1.. maxnoofE-RABs)) OF ProtocolIE-SingleContainer {
{E-RABToBeSetupItemCtxtSUReqIEs} }
E-RABToBeSetupItemCtxtSUReqIEs              S1AP-PROTOCOL-IES ::={
    { ID id-E-RABToBeSetupItemCtxtSUReq         CRITICALITY reject          TYPE E-RABToBeSetupItemCtxtSUReq
    PRESENCE mandatory },
    ...
}
E-RABToBeSetupItemCtxtSUReq ::= SEQUENCE {
    e-RAB-ID                            E-RAB-ID,
    e-RABlevelQoSParameters                     E-RABLevelQoSParameters,
    transportLayerAddress                       TransportLayerAddress,
    gTP-TEID                            GTP-TEID,
    nAS-PDU                         NAS-PDU         OPTIONAL,
    iE-Extensions                           ProtocolExtensionContainer { {E-RABToBeSetupItemCtxtSUReqExtIEs} }
OPTIONAL,
    ...
}
E-RABToBeSetupItemCtxtSUReqExtIEs S1AP-PROTOCOL-EXTENSION ::= {
    { ID id-Correlation-ID                  CRITICALITY ignore EXTENSION Correlation-ID  PRESENCE
optional},
    { ID id-LIPA-SIPTO-Flag                 CRITICALITY ignore EXTENTION LIPA-SIPTO-Flag    PRESENCE
optional},
    ...
}
```

Figure 4:
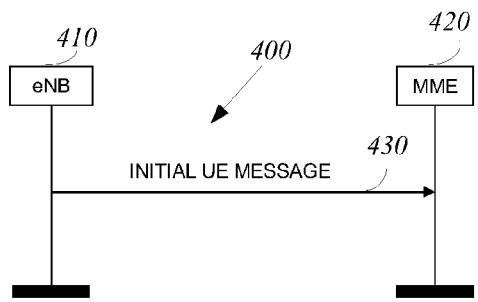
FIG. 4 is a schematic flow-chart illustration of an initial user equipment message procedure, in accordance with some demonstrative embodiments.

Reference is now made to FIG. 4, which is a schematic flow-chart illustration of an INITIAL UE MESSAGE procedure 400, in accordance with some demonstrative embodiments. In some embodiments, an MME 420 may receive from an eNB 410, which may be configured with L-GW function for SIPTO@LN operation, an INITIAL UE MESSAGE message 430, which may include a L-GW transport layer address IE and local network ID IE. For example, the L-GW transport layer address IE and the local network ID IE may be configured to provide information to MME 420 about eNB 410 support of LIPA or SIPTO@LN and to learn the L-GW address or local network ID of eNB 410, if desired.

According to some embodiments, Table 3 below describes an exemplary content of the INITIAL UE MESSAGE message 430, if desired

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| NAS-PDU | M | | 9.2.3.5 | | YES | reject |
| TAI | M | | 9.2.3.16 | Indicating the Tracking Area from which the UE has sent the NAS message. | YES | reject |
| E-UTRAN CGI | M | | 9.2.1.38 | Indicating the E-UTRAN CGI from which the UE has sent the NAS message. | YES | ignore |
| RRC Establishment Cause | M | | 9.2.1.3a | | YES | Ignore |
| S-TMSI | O | | 9.2.3.6 | | YES | reject |
| CSG Id | O | | 9.2.1.62 | | YES | reject |
| GUMMEI | O | | 9.2.3.9 | | YES | reject |
| Cell Access Mode | O | | 9.2.1.74 | | YES | reject |
| LIPA GW Transport Layer Address | O | | Transport Layer Address 9.2.2.1 | Indicating LIPA GW Transport Layer Address if the GW is collocated with eNB. | YES | ignore |
| Relay Node Indicator | O | | 9.2.1.79 | Indicating a relay node. | YES | reject |
| GUMMEI Type | O | | ENUMERATED (native, mapped, . . .) | | YES | reject |
| Tunnel Information for BBF | O | | Tunnel Information 9.2.2.3 | Indicating HeNB's Local IP Address assigned by the broadband access provider, UDP port Number. | YES | ignore |
| SIPTO L-GW Transport Layer Address | O | | Transport Layer Address 9.2.2.1 | Indicating SIPTO GW Transport Layer Address if the GW is collocated with eNB. | YES | ignore |
| Local Network ID | O | | | Indicating Local (H)eNB Network ID if L-GW is standalone | YES | ignore |

According to one demonstrative embodiment, the L-GW may be co-located with the eNB. According to this embodiment the INITIAL UE MESSAGE message may provide MME 420 with the SIPTO L-GW Transport layer address and/or SIPTO L-GW Transport layer address.

According to another demonstrative embodiment, the L-GW may be separate from the eNB. According to this embodiment, the INITIAL UE MESSAGE message may provide MME 420 with the local network ID of the HeNB and/or the eNB, although, the scope of the present embodiment is not limited to this example.

According to some embodiments, an example of an INITIAL UE MESSAGE function, may include, for example, the following:

dance with some demonstrative embodiments. In some demonstrative embodiments, an MME 520 may receive from an eNB 510, which is configured with L-GW function for SIPTO@LN or LIPA operation, an UPLINK NAS TRANSPORT 530 message, which may include a L-GW transport layer address IE local network ID IE. For example, L-GW transport layer address IE local network ID IE may include information about whether eNB 510 supports LIPA and/or SIPTO@LN, and the L-GW address and/or the local network ID of the eNB, if desired.

```
-- ****************************************************************
--
-- INITIAL UE MESSAGE
--
-- ****************************************************************
InitialUEMessage ::= SEQUENCE {
    protocolIEs    ProtocolIE-Container        {{InitialUEMessage-IEs}},
    ...
}
InitialUEMessage-IEs S1AP-PROTOCOL-IES ::={
    { ID id-eNB-UE-S1AP-ID              CRITICALITY reject      TYPE ENB-UE-S1AP-ID
      PRESENCE mandatory} |
    { ID id-NAS-PDU                     CRITICALITY reject      TYPE NAS-PDU
      PRESENCE mandatory} |
    { ID id-TAI                         CRITICALITY reject      TYPE TAI
      PRESENCE mandatory} |
    { ID id-EUTRAN-CGI                  CRITICALITY ignore      TYPE EUTRAN-CGI
      PRESENCE mandatory} |
    { ID id-RRC-Establishment-Cause     CRITICALITY ignore      TYPE RRC-Establishment-Cause
      PRESENCE mandatory} |
    { ID id-S-TMSI                      CRITICALITY reject      TYPE S-TMSI
      PRESENCE optional} |
    { ID id-CSG-Id                      CRITICALITY reject      TYPE CSG-Id
      PRESENCE optional} |
    { ID id-GUMMEI-ID                   CRITICALITY reject      TYPE GUMMEI
      PRESENCE optional} |
    { ID id-CellAccessMode              CRITICALITY reject      TYPE CellAccessMode
      PRESENCE optional} |
    { ID id-LIPA-GW-TransportLayerAddress   CRITICALITY ignore  TYPE TransportLayerAddress
      PRESENCE optional} |
    { ID id-RelayNode-Indicator         CRITICALITY reject      TYPE RelayNode-Indicator
      PRESENCE optional} |
    { ID id-GUMMEIType                  CRITICALITY reject      TYPE GUMMEIType
      PRESENCE optional} |
-- Extension for Release 11 to support BBAI --
    { ID id-Tunnel-Information-for-BBF      CRITICALITY ignore   TYPE TunnelInformation
      PRESENCE optional} |
    { ID id-SIPTO-L-GW-TransportLayerAddress    CRITICALITY ignore   TYPE TransportLayerAddress
      PRESENCE optional} |
    { ID id-LocalNetworkID              CRITICALITY ignore      TYPE LocalNetworkID
      PRESENCE optional},
    ...
}
```

Figure 5:
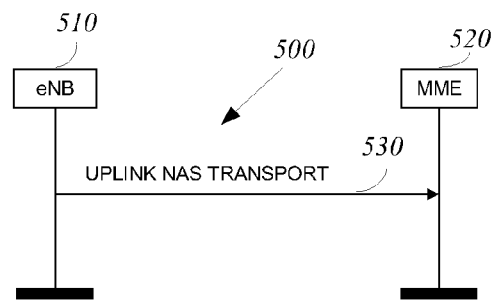
FIG. 5 is a schematic flow-chart illustration of an uplink Non Access Stratum (NAS) procedure, in accordance with some demonstrative embodiments.

Reference is now made to FIG. 5 which is a schematic flow-chart illustration of an UPLINK NON ACCESS STRATUM (NAS) TRANSPORT procedure 500, in accordance with some embodiments, Table 4 below describes an exemplary content of the UPLINK NAS TRANSPORT message 530, if desired:

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| NAS-PDU | M | | 9.2.3.5 | | YES | reject |
| E-UTRAN CGI | M | | 9.2.1.38 | | YES | ignore |
| TAI | M | | 9.2.3.16 | | YES | ignore |
| LIPA GW Transport | O | | Transport | Indicating LIPA GW | YES | ignore |

TABLE 4-continued

| IE/Group Name | Presence | Range | IE type and reference | Semantics description | Criticality | Assigned Criticality |
|---|---|---|---|---|---|---|
| Layer Address | | | Layer Address 9.2.2.1 | Transport Layer Address if the GW is collocated with eNB. | | |
| SIPTO L-GW Transport Layer Address | O | | Transport Layer Address 9.2.2.1 | Indicating SIPTO GW Transport Layer Address if the GW is collocated with eNB. | YES | ignore |
| Local Network ID | O | | | Indicating Local (H)eNB Network ID if L-GW is standalone | YES | ignore |

According to one demonstrative embodiment, the L-GW may be co-located with the eNB. According to this embodiment, the UPLINK NAS TRANSPORT message may provide MME 420 with the SIPTO L-GW Transport layer address and/or SIPTO L-GW Transport layer address.

According to another demonstrative embodiment, the L-GW may be separate from the eNB. According to this embodiment, the UPLINK NAS TRANSPORT message may provide MME 420 with the local network ID of the HeNB and/or the eNB, although, the scope of the present embodiment is not limited to this example.

According to some embodiments, an UPLINK NAS TRANSPORT function may include the following:

```
-- ****************************************************************
--
-- UPLINK NAS TRANSPORT
--
-- ****************************************************************
UplinkNASTransport ::= SEQUENCE {
        protocolIEs    ProtocolIE-Container        {{UplinkNASTransport-IEs}},
        ...
}
UplinkNASTransport-IEs S1AP-PROTOCOL-IES ::= {
        { ID id-MME-UE-S1AP-ID               CRITICALITY reject        TYPE MME-UE-S1AP-ID
          PRESENCE mandatory} |
        { ID id-eNB-UE-S1AP-ID               CRITICALITY reject        TYPE ENB-UE-S1AP-ID
          PRESENCE mandatory} |
        { ID id-NAS-PDU                      CRITICALITY reject        TYPE NAS-PDU
          PRESENCE mandatory} |
        { ID id-EUTRAN-CGI                   CRITICALITY ignore        TYPE EUTRAN-CGI
          PRESENCE mandatory} |
        { ID id-TAI                          CRITICALITY ignore        TYPE TAI
          PRESENCE mandatory} |
        { ID id-GW-TransportLayerAddress     CRITICALITY ignore   TYPE TransportLayerAddress
          PRESENCE optional}|
        { ID id-SIPTO-L-GW-TransportLayerAddress    CRITICALITY ignore      TYPE TransportLayerAddress
          PRESENCE optional} |
        { ID id-LocalNetworkID               CRITICALITY ignore        TYPE LocalNetworkID
          PRESENCE optional},
        ...
}
```

Figure 6:
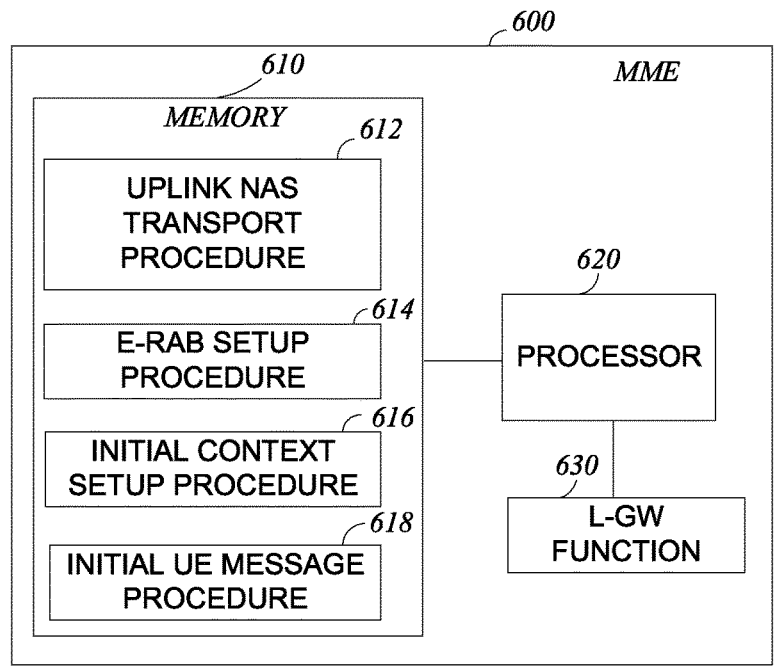
FIG. 6 is a schematic block diagram illustration of a Mobility Management Entity (MME), in accordance with some demonstrative embodiments.

Reference is now made to FIG. 6, which is a schematic block diagram illustration of a MME 600, in accordance with some demonstrative embodiments.

In some demonstrative embodiments, MME 600 may include a memory 610, a processor circuitry 620 and a L-GW function 630.

For example, memory 610 may be a FLASH memory, SSD, a hard drive, a mass storage device or the like. In some embodiments, for example, memory 610 may store instructions and data, which may be used by processor circuitry 620. Memory 610 may store an UPLINK NAS TRANSPORT procedure 612, an E-RAB SETUP procedure 614, an INITIAL CONTEXT SETUP procedure 616 and/or an INITIAL UE MESSAGE procedure 618.

In operation and according to some embodiments, processor circuitry 620 may be configured to establish the connection to the Internet or local network via a local gateway (L-GW) function 630 for a LIPA and/or a SIPTO@LN. MME 600 may use one or more S1 procedures to establish the connection to the Internet. For example, MME 600 may use one or more of an E-RAB SETUP procedure 614, and an INITIAL CONTEXT SETUP procedure 616, to establish a connection of an UE to the Internet, if desired.

For example, when using E-RAB SETUP procedure 614, processor circuitry 620 may send to an eNB an E-RAB SETUP REQUEST message, which may include a correlation ID information element (IE), wherein the eNB is configured with L-GW function for LIPA operation or SIPTO@LN operation and configured to use information included in the correlation ID for LIPA operation or SIPTO@LN operation for a concerned E-RAB. For example, the eNB may use this information to understand which bearers may be routed to the L-GW. Processor circuitry 620 may be configured to receive an E-RAB SETUP RESPONSE message from the eNB, which may include a result for an at least one requested E-RAB, although the scope of some embodiments is not limited in this respect.

In a further example, when using INITIAL CONTEXT SETUP REQUEST procedure 616, processor circuitry 620 may send to eNB an INITIAL CONTEXT SETUP REQUEST message that includes a correlation ID IE, wherein the eNB is configured with L-GW function for LIPA operation or SIPTO@LN operation and configured to use information included in the correlation ID for LIPA operation or SIPTO@LN operation for a concerned E-RAB. For example, the eNB may use this information to understand which bearers may be routed to the L-GW. Processor circuitry 620 may be configured to receive an INITIAL CONTEXT SETUP RESPONSE message from the eNB E-RAB.

When operating with some embodiments and employing INITIAL UE MESSAGE procedure 618, processor circuitry 620 may receive from the eNB an INITIAL UE MESSAGE message that includes a GW transport layer address IE, wherein the eNB is configured with L-GW function for SIPTO@LN operation. Furthermore, when employing UPLINK NAS TRANSPORT procedure, processor circuitry 620 may receive from the eNB an UPLINK NAS TRANSPORT message that include a GW transport layer address IE, wherein the eNB is configured with L-GW function for SIPTO@LN operation, although some embodiments are not limited to this example.

For example, the MME may use the information to support eNB that supports LIPA and /or SIPTO@LN, and may use the L-GW address and/or a local network ID, which may be provided by the GW transport layer address IE, if desired.

Figure 7:
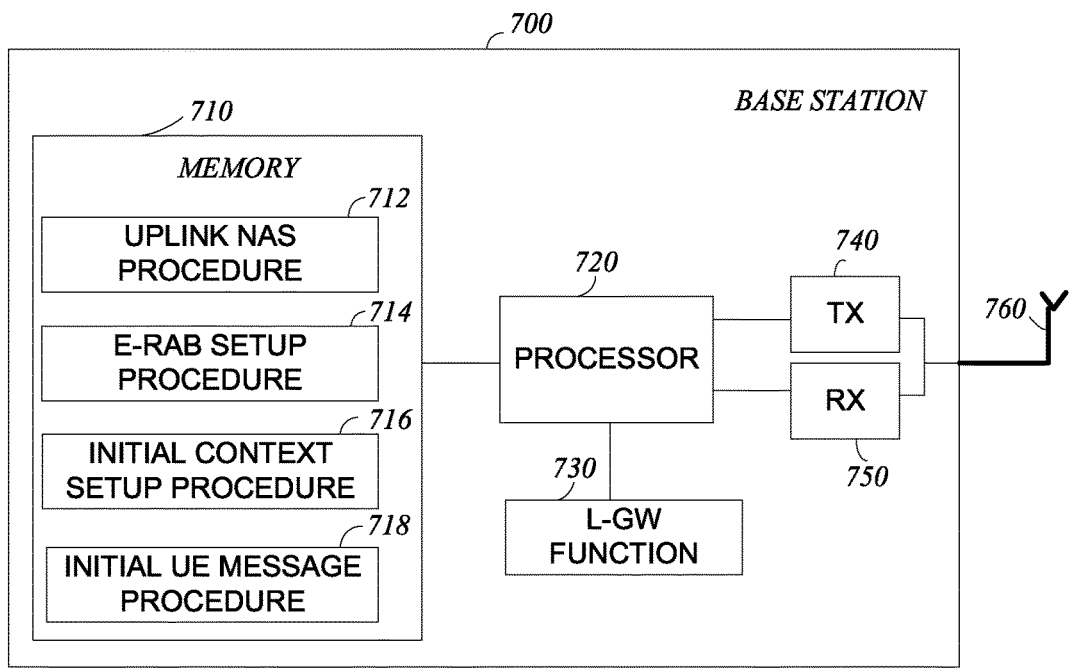
FIG. 7 is a schematic block diagram illustration of a base station in accordance with some demonstrative embodiments.

Reference is made to FIG. 7, which is a schematic block diagram illustration of a base station 700, in accordance with some demonstrative embodiments. In some demonstrative embodiments, base station 700 may include an eNB, a HeNodeB, or the like. Base station 700, for example eNB, may include a memory 710, a processor circuitry 720, a L-GW function 730, at least one transmitter (TX) 740, at least one receiver (RX) 750, and an at least one antenna 760.

For example, base station 700 may be implemented as part of an LTE cellular system and may include an eNodeB, a Home eNodeB, a femto cell, a pico cell, a cellular node, or the like. It should be understood that only some of the base station functionalities and blocks are present. Processor circuitry 720 may include a communication processor to control the downlink-uplink traffic and a software and/or hardware modules to establish a connection of a UE to the internet or local network via a L-GW using SIPTO@LN procedures, if desired.

In some demonstrative embodiments, the at least one antenna 760 may include any type of antennas suitable for transmitting and/or receiving wireless communication signals, blocks, frames, transmission streams, packets, messages and/or data. For example, the at least one antenna 760 may include any suitable configuration, structure and/or arrangement of one or more antenna elements, components, units, assemblies and/or arrays. For example, antennas 760 may include an antenna array, an antenna tower, a phased array antenna, a dipole antenna, a single element antenna, a set of switched beam antennas, and/or the like.

In some demonstrative embodiments, the at least on transmitter 740 may transmit signals via a downlink modulated according to OFDM modulation scheme, and the at least one receiver 750 may receive signals from an uplink modulated according to SC-FDMA modulation scheme. According to some exemplary embodiments, the at least one transmitter 740 and the at least one receiver 750 may be controlled by a multiple input multiple output (MIMO) module and may be configured to generate a beamforming, if desired.

For example, memory 710 may be a FLASH memory, SSD, a hard drive, a mass storage device or the like. In some embodiments, for example, memory 710 may store instructions and data, which may be used by processor circuitry 720. Memory 710 may store an UPLINK NAS TRANSPORT procedure 712, an E-RAB SETUP procedure 714, an INITIAL CONTEXT SETUP procedure 716, and/or an INITIAL UE MESSAGE procedure 718.

In operation and according to some embodiments, processor circuitry 720 may be configured to establish the connection to the Internet or local network via a L-GW function for LIPA or SIPTO@LN, wherein connection establishment to the Internet or local network involves at least one INITIAL UE MESSAGE procedure 718 or UPLINK NAS TRANSPORT procedure 712, if desired.

According to one example embodiment, base station 700 may include an eNB and receiver 750 may be configured to receive an E-RAB SETUP REQUEST message that includes a correlation ID information element (IE). The eNB may be configured with L-GW function 730 for LIPA operation and/or SIPTO@LN operation. In addition, the eNB may be configured to use information included in the correlation ID for LIPA operation and/or SIPTO@LN operation for a concerned E-RAB. Transmitter 740 may be configured to transmit an E-RAB SETUP RESPONSE message, which includes a result for an at least one requested E-RAB, although it should be understood that the scope some embodiments is not limited to this example.

According to another example embodiment, receiver 750 may be configured to receive an INITIAL CONTEXT SETUP REQUEST message, which includes a correlation ID IE. The eNB may be configured with L-GW function 730 for LIPA operation and/or SIPTO@LN operation. Furthermore, the eNB may be configured to use the information included in the correlation ID for LIPA operation and/or SIPTO@LN operation. Transmitter 740 may be configured to transmit an INITIAL CONTEXT SETUP RESPONSE message, although it should be understood that the scope of some embodiments is not limited to this example.

According to some embodiments, transmitter 740 may be configured to transmit an INITIAL UE MESSAGE message, which includes a GW transport layer address IE. In addition, transmitter 740 may be configured to transmit an UPLINK NAS TRANSPORT message, which includes a L-GW transport layer address IE, although it should be understood that the scope of some embodiments is not limited to these examples.

Figure 8:
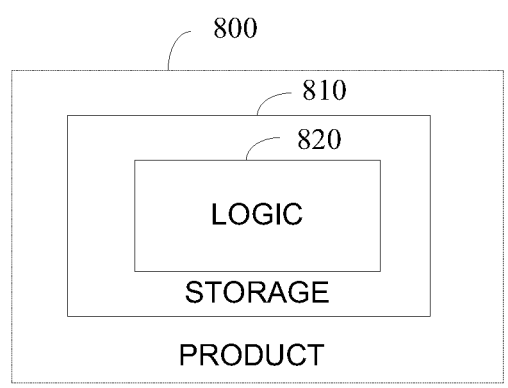
FIG. 8 is a schematic illustration of a product, in accordance with some demonstrative embodiments.

Reference is made to FIG. 8, which schematically illustrates a product of manufacture 800, in accordance with some demonstrative embodiments. Product 800 may include a non-transitory machine-readable storage medium 810 to store logic 820, which may be used, for example, to perform at least part of the functionality of base station 700 (FIG. 7) and/or MME 600 (FIG. 6), and/or to perform one or more operations of the S1 procedures such as, for example E-RAB SETUP procedure 200 (FIG. 2), INITIAL CONTEXT SETUP procedure 300 (FIG. 3), INITIAL UE MESSAGE procedure 400 (FIG. 4) and/or UPLINK NAS TRANSPORT procedure 500 (FIG. 5). The phrase "non-transitory machine-readable medium" is directed to include all computer-readable media, with the sole exception being a transitory propagating signal.

In some demonstrative embodiments, product 800 and/or machine-readable storage medium 810 may include one or more types of computer-readable storage media capable of storing data, including volatile memory, non-volatile memory, removable or non-removable memory, erasable or non-erasable memory, writeable or re-writeable memory, and the like. For example, machine-readable storage medium 810 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 820 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 820 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a method of communication to Internet operated by a mobility management entity (MME), the method comprising configuring an evolved Node-B(eNB) to establish connection to the Internet via a local gateway (L-GW) function for a local IP access (LIPA) or a Selected IP traffic offload at a local network (SIPTO@LN), wherein establishing the connection to the Internet includes performing at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 2 includes the subject matter of Example 1, and optionally, wherein the E-RAB setup procedure comprises sending to the eNB an E-RAB setup request message including a correlation ID information element (IE), wherein information included in the correlation ID is configured to enable the eNB to perform the LIPA operation or SIPTO@LN operation for a concerned E-RAB; and receiving an E-RAB setup response message from the eNB, the E-RAB setup response message including a result for an at least one requested E-RAB.

Example 3 includes the subject matter of Example 1, and optionally, wherein the initial context setup procedure comprises sending to the eNB an initial context setup request message including a correlation ID IE, wherein information included in the correlation ID is configured to enable the eNB to perform the LIPA operation or SIPTO@LN operation for a concerned E-RAB; and receiving an initial context setup response message from the eNB.

Example 4 includes the subject matter of Example 1, and optionally, wherein the initial UE message procedure comprises receiving from the eNB an INITIAL UE MESSAGE message including a GW transport layer address IE, and establishing the connection to the Internet via a L-GW function for SIPTO@LN.

Example 5 includes the subject matter of Example 1, and optionally, wherein the uplink NAS transport procedure comprises receiving from the eNB an UPLINK NAS TRANSPORT message including a GW transport layer address IE, and establishing the connection to the Internet via a L-GW function for SIPTO@LN.

Example 6 includes an evolved Node-B(eNB) configured to establish communication to the Internet, the eNB comprising a processor circuitry configured to establish the connection to the Internet via a local gateway (L-GW) function for a local IP access (LIPA) or a Selected IP traffic offload at a local network (SIPTO@LN), the processor circuitry to establish the connection to the Internet by at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 7 includes the subject matter of Example 6, and optionally, comprising a receiver to receive an E-RAB SETUP REQUEST message including a correlation ID information element (IE), wherein the eNB is configured with a L_GW function for LIPA operation or SIPTO@LN operation, and the eNB is configured to use information included in the correlation ID for LIPA operation or SIPTO@LN operation for a concerned E-RAB; and a transmitter to transmit an E-RAB SETUP RESPONSE including a result for an at least one requested E-RAB.

Example 8 includes the subject matter of Example 6, and optionally, comprising a receiver to receive an INITIAL CONTEXT SETUP REQUEST message including a correlation ID IE, wherein the eNB is configured with a L_GW function for LIPA operation or SIPTO@LN operation, and configured to use information included in the correlation ID for LIPA operation or SIPTO@LN operation for a concerned E-RAB; and a transmitter to transmit an INITIAL CONTEXT SETUP RESPONSE message from the eNB.

Example 9 includes the subject matter of Example 6, and optionally, comprising a transmitter to transmit an INITIAL UE MESSAGE message including a GW transport layer address IE, wherein the eNB is configured with a L_GW function for SIPTO@LN operation.

Example 10 includes the subject matter of Example 6, and optionally, comprising a transmitter to transmit an UPLINK NAS TRANSPORT message including a GW transport layer address IE, wherein the eNB is configured with a L_GW function for SIPTO@LN operation.

Example 11 includes a cellular system comprising an evolved Node-B (eNB) operably coupled to an antenna array and configured to establish communication to Internet, the eNB comprising a processor configured to establish the connection to the Internet via a local gateway (L-GW) function for a local IP access (LIPA) or a Selected IP traffic offload at a local network (SIPTO@LN), the processor to establish the connection to the Internet by at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 12 includes the subject matter of Example 11, and optionally, wherein the eNB comprises a receiver to receive an E-RAB SETUP REQUEST message including a correlation ID information element (IE), wherein the eNB is configured with a L_GW function for LIPA operation or SIPTO@LN operation, and the eNB is configured to use information included in the correlation ID for LIPA operation or SIPTO@LN operation for a concerned E-RAB; and a transmitter to transmit an E-RAB SETUP RESPONSE including a result for an at least one requested E-RAB.

Example 13 includes the subject matter of Example 11, and optionally, wherein the eNB comprises a receiver to receive an INITIAL CONTEXT SETUP REQUEST message including a correlation ID IE, wherein the eNB is configured with a L_GW function for LIPA operation or SIPTO@LN operation, and wherein the eNB is configured to use information included in the correlation ID for LIPA operation or SIPTO@LN operation for a concerned E-RAB; and a transmitter to transmit an INITIAL CONTEXT SETUP RESPONSE message from the eNB.

Example 14 includes the subject matter of Example 13, and optionally, wherein the processor is configured to terminate the initial context setup procedure.

Example 15 includes the subject matter of Example 11, and optionally, wherein the eNB comprises a transmitter to transmit an INITIAL UE MESSAGE message including a GW transport layer address IE, wherein the eNB is configured with a L_GW function for SIPTO@LN operation.

Example 16 includes the subject matter of Example 11, and optionally, wherein the eNB comprises a transmitter to transmit an UPLINK NAS TRANSPORT message including a GW transport layer address IE, wherein the eNB is configured with a L GW function for SIPTO@LN operation.

Example 17 includes a mobility management entity (MME) configured to enable an establishment of communication to the Internet, the MME comprising a processor circuitry configured to enable the establishment of the connection to the Internet via a local gateway (L-GW) function for a local IP access (LIPA) or a Selected IP traffic offload at a local network (SIPTO@LN), wherein the processor circuitry is to enable the establishment of the connection to the Internet by at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 18 includes the subject matter of Example 17, and optionally, wherein the processor circuitry is configured to send to an evolved Node-B(eNB) an E-RAB SETUP REQUEST message including a correlation ID information element (IE), wherein information included in the correlation ID is configured to enable the eNB to perform the LIPA operation or SIPTO@LN operation for a concerned E-RAB; and to receive an E-RAB SETUP RESPONSE message from the eNB, the E-RAB SETUP RESPONSE message including a result for an at least one requested E-RAB.

Example 19 includes the subject matter of Example 17, and optionally, wherein the processor circuitry is configured to send to an evolved Node-B(eNB) an INITIAL CONTEXT SETUP request message including a correlation ID IE, wherein information included in the correlation ID is configured to enable the eNB to perform the LIPA operation or SIPTO@LN operation for a concerned E-RAB; and receive an INITIAL CONTEXT setup response message from the eNB.

Example 20 includes the subject matter of Example 17, and optionally, wherein the processor circuitry is configured to receive from an evolved Node-B(eNB)an INITIAL UE MESSAGE message including a GW transport layer address IE; and establish the connection to the Internet via a L-GW function for SIPTO@LN.

Example 21 includes the subject matter of Example 17, and optionally, wherein the processor circuitry is configured to receive from an evolved Node-B(eNB) an UPLINK NAS TRANSPORT message including a GW transport layer address IE; and establish the connection to the Internet via a L-GW function for SIPTO@LN.

Example 22 includes a product including a non-transitory storage medium having stored thereon instructions that, when executed by a machine, result in establishing a connection to the Internet via a local gateway (L-GW) function for a local IP access (LIPA) or a Selected IP traffic offload at a local network (SIPTO@LN), wherein establishing a connection to the Internet includes performing at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 23 includes the subject matter of Example 22, and optionally, wherein instructions of the E-RAB SETUP procedure, when executed result in reception of an E-RAB SETUP REQUEST message including a correlation ID information element (IE), wherein information included in the correlation ID is configured to enable an Evolved Node B (eNB) to perform the LIPA operation or SIPTO@LN operation for a concerned E-RAB; and transmitting an E-RAB SETUP RESPONSE including a result for an at least one requested E-RAB.

Example 24 includes the subject matter of Example 22, and optionally, wherein instructions of the INITIAL CONTEXT SETUP procedure, when executed result in receiving an INITIAL CONTEXT SETUP REQUEST message including a correlation ID IE, wherein information included in the correlation ID is configured to enable an Evolved Node B (eNB) to perform the LIPA operation or SIPTO@LN operation for a concerned E-RAB; and transmitting an INITIAL CONTEXT SETUP RESPONSE message from the eNB, the INITIAL CONTEXT SETUP RESPONSE message including a result for an at least one requested E-RAB.

Example 25 includes the subject matter of Example 22, and optionally, wherein instructions of the INITIAL UE MESSAGE procedure, when executed result in transmitting an INITIAL UE MESSAGE message including a GW transport layer address IE; and establishing the connection to the Internet via a L-GW function for SIPTO@LN.

Example 26 includes the subject matter of Example 22, and optionally, wherein instructions of the UPLINK NAS TRANSPORT procedure, when executed result in transmitting an UPLINK NAS TRANSPORT message including a GW transport layer address IE; and establishing the connection to the Internet via a L-GW function for SIPTO@LN.

Example 27 includes a product including a non-transitory storage medium having stored thereon instructions that, when executed by a machine, result in at a mobility management entity (MME), configuring an evolved Node-B (eNB) to establish connection to the Internet via a local gateway (L-GW) function for a local IP access (LIPA) or a Selected IP traffic offload at a local network (SIPTO@LN), wherein establishing the connection to the Internet includes performing at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 28 includes the subject matter of Example 27, and optionally, wherein the instructions result in sending from the MME to the eNB an E-RAB setup request message including a correlation ID information element (IE), wherein information included in the correlation ID is configured to enable the eNB to perform the LIPA operation or SIPTO@LN operation for a concerned E-RAB; and receiving an E-RAB setup response message from the eNB, the E-RAB setup response message including a result for an at least one requested E-RAB.

Example 29 includes the subject matter of Example 27, and optionally, wherein the instructions result in sending to the eNB an initial context setup request message including a correlation ID IE, wherein information included in the correlation ID is configured to enable the eNB to perform the LIPA operation or SIPTO@LN operation for a concerned E-RAB; and receiving an initial context setup response message from the eNB.

Example 30 includes the subject matter of Example 27, and optionally, wherein the instructions result in receiving from the eNB—an INITIAL UE MESSAGE message including a GW transport layer address IE, and establishing the connection to the Internet via a L-GW function for SIPTO@LN.

Example 31 includes the subject matter of Example 27, and optionally, wherein the instructions result in receiving from the eNB an UPLINK NAS TRANSPORT message including a GW transport layer address IE, and establishing the connection to the Internet via a L-GW function for SIPTO@LN.

Example 32 includes an apparatus comprising means for configuring an evolved Node-B(eNB) to establish connection to the Internet via a local gateway (L-GW) function for a local IP access (LIPA) or a Selected IP traffic offload at a local network (SIPTO@LN), wherein establishing the connection to the Internet includes performing at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 33 includes the subject matter of Example 32, and optionally, comprising means for sending from the MME to the eNB an E-RAB setup request message including a correlation ID information element (IE), wherein information included in the correlation ID is configured to enable the eNB to perform the LIPA operation or SIPTO@LN operation for a concerned E-RAB; and means for receiving an E-RAB setup response message from the eNB, the E-RAB setup response message including a result for an at least one requested E-RAB.

Example 34 includes the subject matter of Example 32, and optionally, comprising means for sending to the eNB an initial context setup request message including a correlation ID IE, wherein information included in the correlation ID is configured to enable the eNB to perform the LIPA operation or SIPTO@LN operation for a concerned E-RAB; and means for receiving an initial context setup response message from the eNB.

Example 35 includes the subject matter of Example 32, and optionally, comprising means for receiving from the eNB—an INITIAL UE MESSAGE message including a GW transport layer address IE, and establishing the connection to the Internet via a L-GW function for SIPTO@LN.

Example 36 includes the subject matter of Example 32, and optionally, comprising means for receiving from the eNB an UPLINK NAS TRANSPORT message including a GW transport layer address IE, and establishing the connection to the Internet via a L-GW function for SIPTO@LN.

Example 37 includes a method of establishing communication to the Internet, the method comprising at an Evolved node B (eNB), establishing a connection to the Internet via a local gateway (L-GW) function for a local IP access (LIPA) or a Selected IP traffic offload at a local network (SIPTO@LN), wherein establishing a connection to the Internet includes performing at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 38 includes the subject matter of Example 37, and optionally, wherein the E-RAB SETUP procedure includes receiving an E-RAB SETUP REQUEST message including a correlation ID information element (IE), wherein information included in the correlation ID is configured to enable an Evolved Node B (eNB) to perform the LIPA operation or SIPTO@LN operation for a concerned E-RAB; and transmitting an E-RAB SETUP RESPONSE including a result for an at least one requested E-RAB.

Example 39 includes the subject matter of Example 37, and optionally, wherein the INITIAL CONTEXT SETUP procedure includes receiving an INITIAL CONTEXT SETUP REQUEST message including a correlation ID IE, wherein information included in the correlation ID is configured to enable an Evolved Node B (eNB) to perform the LIPA operation or SIPTO@LN operation for a concerned E-RAB; and transmitting an INITIAL CONTEXT SETUP RESPONSE message from the eNB, the INITIAL CONTEXT SETUP RESPONSE message including a result for an at least one requested E-RAB.

Example 40 includes the subject matter of Example 37, and optionally, wherein the INITIAL UE MESSAGE procedure includes transmitting an INITIAL UE MESSAGE message including a GW transport layer address IE; and establishing the connection to the Internet via a L-GW function for SIPTO@LN.

Example 41 includes the subject matter of Example 37, and optionally, wherein the UPLINK NAS TRANSPORT procedure includes transmitting an UPLINK NAS TRANSPORT message including a GW transport layer address IE; and establishing the connection to the Internet via a L-GW function for SIPTO@LN.

Example 42 includes an apparatus comprising means for establishing a connection to the Internet via a local gateway (L-GW) function for a local IP access (LIPA) or a Selected IP traffic offload at a local network (SIPTO@LN), wherein establishing a connection to the Internet includes performing at least one of an Evolved Universal Terrestrial Radio Access Network (E-UTRAN) Radio Access Bearer (E-RAB) setup procedure, an initial context setup procedure, an initial user equipment (UE) message procedure or an uplink Non Access Stratum (NAS) transport procedure.

Example 43 includes the subject matter of Example 42, and optionally, comprising means for receiving an E-RAB SETUP REQUEST message including a correlation ID information element (IE), wherein information included in the correlation ID is configured to enable an Evolved Node B (eNB) to perform the LIPA operation or SIPTO@LN operation for a concerned E-RAB; and means for transmitting an E-RAB SETUP RESPONSE including a result for an at least one requested E-RAB.

Example 44 includes the subject matter of Example 42, and optionally, comprising means for receiving an INITIAL CONTEXT SETUP REQUEST message including a correlation ID IE, wherein information included in the correlation ID is configured to enable an Evolved Node B (eNB) to perform the LIPA operation or SIPTO@LN operation for a concerned E-RAB; and means for transmitting an INITIAL CONTEXT SETUP RESPONSE message from the eNB, the INITIAL CONTEXT SETUP RESPONSE message including a result for an at least one requested E-RAB.

Example 45 includes the subject matter of Example 42, and optionally, comprising means for transmitting an INITIAL UE MESSAGE message including a GW transport layer address IE; and means for establishing the connection to the Internet via a L-GW function for SIPTO@LN.

Example 46 includes the subject matter of Example 42, and optionally, comprising means for transmitting an UPLINK NAS TRANSPORT message including a GW transport layer address IE; and means for establishing the connection to the Internet via a L-GW function for SIPTO@LN.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An evolved NodeB (eNB), comprising:
a processor; and
a communication module, coupled to the processor, to:
  transmit an initial user equipment (UE) message to a Mobility Management Entity (MME) before forwarding a first uplink non-access stratum (NAS) message, wherein the initial UE message comprises a selected Internet Protocol (IP) traffic offload (SIPTO) local gateway (L-GW) transport layer address based on the eNB support of SIPTO at local network (SIPTO@LN) function for an Internet access through a local network,
wherein the SIPTO L-GW transport layer address is to indicate that a SIPTO L-GW collocates with the eNB.

2. The eNB of claim 1, wherein the SIPTO L-GW resides in the local network.

3. An evolved NodeB (eNB), comprising:
a processor; and
a communication module, coupled to the processor, to:
  transmit an uplink non-access stratum (NAS) transport message to a Mobility Management Entity (MME), wherein the uplink non-access stratum (NAS) message comprises a selected Internet Protocol (IP) traffic offload (SIPTO) local gateway (L-GW) transport layer address based on the eNB support of SIPTO at local network (SIPTO@LN) function for an Internet access through a local network,
wherein the SIPTO L-GW transport layer address is to indicate that a SIPTO L-GW collocates with the eNB.

4. The eNB of claim 3, wherein the SIPTO L-GW resides in the local network.

* * * * *